May 7, 1963 W. L. CRAWFORD 3,088,620
SUPPORTING BRACKET FOR OUTLET BOXES
Filed June 10, 1960

INVENTOR.
WILBUR L. CRAWFORD
BY
Moore, White & Burd
ATTORNEYS

United States Patent Office 3,088,620
Patented May 7, 1963

3,088,620
SUPPORTING BRACKET FOR OUTLET BOXES
Wilbur L. Crawford, 3506 Aldrich Ave. N.,
Minneapolis 12, Minn.
Filed June 10, 1960, Ser. No. 35,279
5 Claims. (Cl. 220—3.9)

This invention relates to new and useful improvements in outlet boxes such as are commonly used in electrical installations, and more particularly to a novel supporting bracket for such outlet boxes.

An outlet or terminal box, when mounted in a wall structure, is usually positioned with one of its walls seated against a side face of one of the wall studdings, and is secured to said studding by nails or screws received in suitable apertures provided in the walls of the terminal box.

Such mounting and securement may be adequate for outlet boxes of the smaller sizes, such as are used for supporting a single switch or outlet receptacle, wherein the overhang of the box from its point of securement to the studding is not great. However, larger outlet boxes designed for supporting two or more switches or other electrical devices, may overhang a relatively greater distance from the studding to which it is secured whereby pressure exerted against the overhanging portion of the outlet box when installed in a wall may cause the outlet box to readily yield in its supporting wall.

Attempts have heretofore been made to provide various forms of devices for supporting the overhanging portions of outlet boxes against inward or outward pressure, but to the best of my knowledge none of these have proven entirely satisfactory.

It is, therefore, an important object of the present invention to provide a simple, inexpensive supporting bracket for supporting the overhanging portion of an outlet box in such manner that, when applied to a conventional outlet or terminal box, said box is not likely to yield to pressure exerted thereagainst when actuating an electrical device contained therein, or where connecting one end of an extension cord to a wall receptacle secured in the outlet box, or disconnecting it therefrom.

A further object of the invention is to provide a supporting bracket for an outlet box of the type including a side wall adapted to be secured to a wall studding, and a bottom wall having an aperture therein, said bracket comprising an elongated flat body portion having a laterally extending tongue or lug adjacent one end adapted to be received in the aperture in said bottom wall, and having means at its opposite end for securing it to the studding at a location remote from said bottom wall, thereby to firmly support the outlet box against inward or outward pressure exerted thereagainst.

A further object of the invention is to provide a supporting bracket for an outlet box, blanked from sheet material and comprising an elongated body portion formed at one end with means for securing it to the bottom wall of an outlet box, and provided at its opposite end with an angularly disposed offset portion having means therein for securing it to a wall studding, whereby said bracket when applied to the outlet box will resist inward pressure exerted against the outlet box as when mounting a switch or outlet receptacle therein, and it will also resist outward pressure which may be exerted thereon as when pulling an electric conductor through one of the knock out holes in the walls of the outlet box.

A further object is to provide a supporting bracket of the class described which presents the utmost in simplicity and ease of application, and is extremely inexpensive to manufacture.

Other objects, advantages, and features of the invention may appear from the construction, arrangement, and combination of the parts as hereinafter set forth, and illustrated in the accompanying drawings, wherein.

Figure 1:
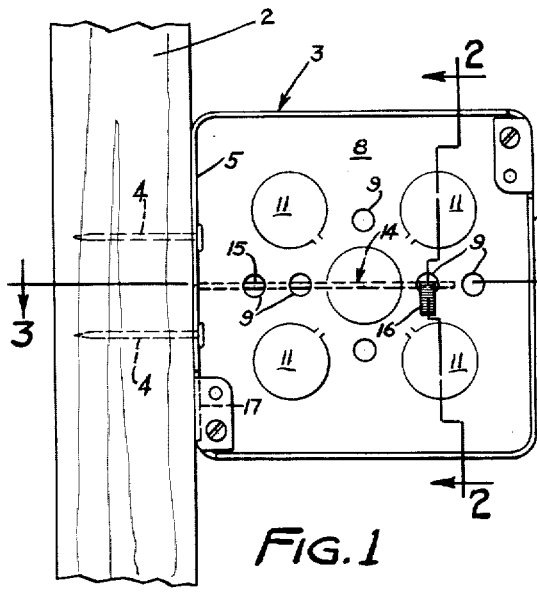
FIGURE 1 is a view showing a front elevation of a conventional outlet box secured to one side of a wall studding, and indicating in dotted lines the novel supporting bracket herein disclosed.
Figure 2:
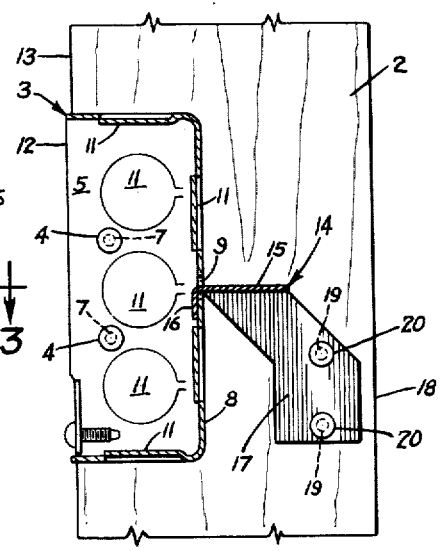
FIGURE 2 is a sectional elevation on the line 2—2 of FIGURE 1 showing the body of the supporting bracket secured to the bottom wall of the outlet box and the offset end portion thereof secured to the side face of the wall studding to which another wall of the outlet box is secured.
Figure 3:
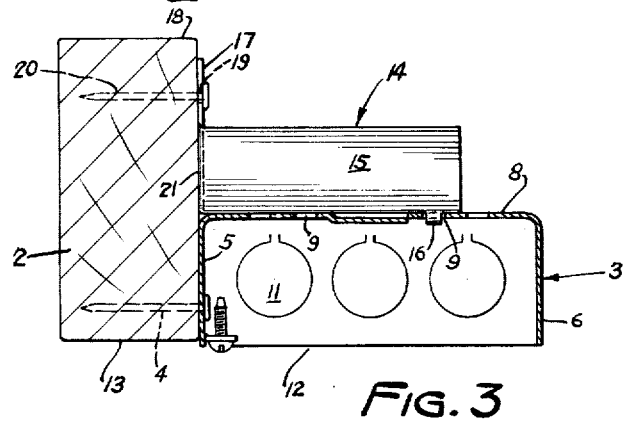
FIGURE 3 is a sectional plan view on the line 3—3 of FIGURE 1, showing the position of the supporting bracket between the terminal box and the studding.

In FIGURES 1, 2 and 3, there is illustrated for purposes of disclosure, a portion of a wall studding 2 to one side of which an outlet box 3 is shown secured by such means as nails 4. It is to be understood that the opposed walls 5 and 6 of the outlet box 3 are provided with apertures 7 for receiving the nails 4, as indicated in FIGURE 2.

The bottom wall 8 of the terminal box is also provided with spaced apertures 9 for receiving nails, etc., when the rear wall of the terminal box is to be secured directly to a suitable support. The bottom and side walls of the outlet box are also shown provided with the usual partially stamped-out areas 11 which may be knocked out as required to form openings for conduits to enter into the outlet box, as is customary.

Outlet boxes, such as herein disclosed, are usually so arranged in the wall structure that the front face 12 thereof bears a predetermined relationship to the front face or edge 13 of the wall studding. The outlet box contains the usual switches and/or outlet receptacles which sometimes require the application of pressure thereto particularly when inserting the plug of an extension cord into a wall receptacle. Such pressure may be sufficient to cause that portion of the outlet box which overhangs from the studding to which it is secured to yield under pressure, which may result in damage to the wall, etc.

Figure 5:
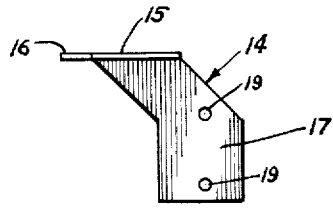
FIGURE 5 is an end view of the bracket as seen in FIGURE 2.
Figure 4:
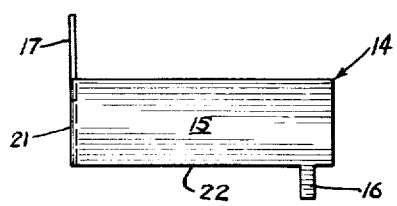
FIGURE 4 is a top view of the supporting bracket detached from the terminal box and showing the laterally extending tongue or lug provided at one end thereof for anchoring the bracket to the bottom wall of the terminal box.

To overcome this objectionable feature, the present invention provides means for resisting horizontal pressures exerted on the outlet box, and consists of a supporting bracket, generally designated by the numeral 14. The bracket comprises an elongated flat body 15, here shown as rectangular in configuration. A laterally extending tongue or lug 16 is provided at one end of the body 15 which normally is disposed in the plane of said body, as best illustrated in FIGURES 4 and 5.

The opposite end of the bracket is formed with an L-shaped portion 17 which is offset from the median plane of the body 15, as best shown in FIGURE 2, to engage the side face of the studding 2 adjacent to its inner edge 18. The offset end portion 17 is provided with apertures 19 for receiving suitable nails or screws adapted to be driven into the studding to firmly secure the offset end portion 17 thereto.

The tongue 16 provided at the opposite or overhanging end portion of the body 15 of the bracket is inserted through one of the apertures 9 in the bottom wall of the outlet box, as clearly illustrated in FIGURES 1, 2 and 3. The lug 16, after being inserted through one of the openings 9, is bent over against the bottom wall 8 of the outlet box, whereby the overhanging end portion of the outlet box is securely supported on the bracket 14 against inward or outward pressure, as will be clearly understood by reference to FIGURES 2 and 3.

From the foregoing, it will be noted that the novel supporting bracket herein disclosed provides a very substantial support for the overhanging end portion of the outlet box. This results because of the offset end portion 17 of the bracket being engaged with the studding adjacent its inner edge 18 remote from the bottom 8 of the outlet box, and because of the opposite end 21 being directly engaged with the side face of the studding, as shown in FIGURE 3.

The supporting bracket 14 is extremely simple and inexpensive in construction. It may readily be blanked from sheet material such as metal, plastic, etc., after which the L-shaped offset end portion 17 is formed by suitable forming dies. The lug 16 is initially straight, as shown in FIGURES 4 and 5. The offset end portion 17 provided at the opposite end of the supporting bracket greatly facilitates the operation of securing the bracket to the studding in that the nail holes are so located therein that a mechanic may readily anchor the bracket to the studding without interference from the outlet box, nor from the body of the bracket nor from any wall elements secured to the rear edges of the studding.

When applying the invention to a conventional outlet box, the outlet box is secured to the side of a studding, as shown in FIGURES 1, 2 and 3, by nails 4. A supporting bracket 15 may next be placed against the back side of the outlet box with its longitudinal edge 22 directly engaging box wall 8, and the tongue 16 passing through one of the apertures 9 in said wall. The offset end portion 17 of the bracket is secured to the studding by nails 20, as shown in FIGURE 2. Thereafter, the tongue or lug 16 of the bracket may be sent against the bottom wall 8 of the outlet box, as shown in FIGURES 1 and 2.

When the bracket 15 has thus been secured to the outlet box and the studding, it will firmly resist inward or outward pressures exerted on the outlet box by a mechanic while installing the necessary electrical devices therein, and also pressure exerted on the outlet box when manipulating a switch mounted therein, or when inserting an extension cord into a wall receptacle supported in the outlet box, or detaching the extension cord therefrom.

Resistance to horizontal pressures exerted on the outlet box will greatly minimize inward yielding of the outlet box in the supporting wall, which may, in some instances, be sufficient to crack the plaster and mar the wall finish adjacent to the outlet box.

The novel supporting bracket herein disclosed has been found extremely practical and labor-saving in actual use. It is simple and inexpensive in construction whereby it may be manufactured in quantity production at extremely low cost. The brackets may also be nested together to conserve storage space and to facilitate packaging. Another feature of the invention resides in the compactness or size of the bracket, whereby an electrician installing the electrical circuits and outlets in a building may readily carry a supply of such brackets in a pocket for immediate use.

The edgewise mounting of the bracket 14 relative to the back wall 8 of the outlet box 3 provides increased strength to resist any inward or outward pressures exerted against the outlet box during installation and subsequent use as electrical devices contained within the box.

It is apparent that many modifications and variations of this invention as hereinbefore set forth may be made without departing from the spirit and scope thereof. The specific embodiments described are given by way of example only and the invention is limited only by the terms of the appended claims.

What is claimed is:
1. A supporting bracket for an electrical outlet box comprising
   a first flat portion adapted to be rigidly secured against the surface of a wall studding,
   an adjacent second flat portion integral with and angularly disposed relative to said first portion in the same plane, and
   an extending third flat portion integral wits and adjacent said second portion and projecting outwardly therefrom, the plane of said third portion being generally perpendicular to the longitudinal axis of said first portion, and the edge of said extending third portion which is most remote from the first portion being provided with
      an integral laterally extending projecting tongue in the plane of said third portion adapted to engage and be secured to said box.

2. The supporting bracket according to claim 1 further characterized in that said third flat portion projects outwardly from the plane of said first and second portions at an angle of about 90°.

3. The supporting bracket according to claim 2 further characterized in that said projecting tongue is adapted to engage a small aperture in the bottom wall of said box and be bendable against the bottom wall of said box thereby supportedly securing said box to said bracket.

4. A supporting bracket
   in combination with an outlet box including a plurality of angular walls,
      one of which is apertured and thereby adapted to secure said box to a wall studding, and
   a bottom wall
      having an aperture therein,
   said supporting bracket comprising
      a first flat portion adapted to be rigidly secured against the surface of a wall studding,
      an adjacent second flat portion integral with and angularly disposed relative to said first portion in the same plane; and
      an extending third flat portion integral with and adjacent said second portion and projecting outwardly therefrom, the plane of said third portion being generally perpendicular to the longitudinal axis of said first portion, and the edge of said extending third portion which is most remote from the first portion being provided with
         an integral laterally extending projecting tongue in the plane of said third portion, said tongue extending through said aperture of said bottom wall of said box and being bent against said bottom wall.

5. The supporting bracket in combination with an outlet box according to claim 4 further characterized in that said third flat portion projects outwardly from the plane of said first and second portions at an angle of about 90°.

References Cited in the file of this patent

UNITED STATES PATENTS

| | | |
|---|---|---|
| 1,346,895 | Johnson | July 20, 1920 |
| 1,814,449 | Morgenstern | July 14, 1931 |
| 2,042,620 | Noyes | June 2, 1936 |
| 2,271,504 | Kees et al. | Jan. 27, 1942 |
| 2,556,061 | Buckels | June 5, 1951 |
| 2,639,054 | Austin | May 19, 1953 |
| 2,937,837 | Johnson | May 24, 1960 |

UNITED STATES PATENT OFFICE
CERTIFICATE OF CORRECTION

Patent No. 3,088,620　　　　　　　　　　　　　　May 7, 1963

Wilbur L. Crawford

It is hereby certified that error appears in the above numbered patent requiring correction and that the said Letters Patent should read as corrected below.

Column 3, line 35, for "sent" read -- bent --; line 66, for "use as" read -- use of --; column 4, line 11, for "wits" read -- with --.

Signed and sealed this 3rd day of December 1963.

(SEAL)
Attest:
ERNEST W. SWIDER

Attesting Officer

EDWIN L. REYNOLDS

Acting Commissioner of Patents